United States Patent
Shtanko

(10) Patent No.: US 6,672,954 B2
(45) Date of Patent: Jan. 6, 2004

(54) AFTERMARKET VEHICLE CABIN VENTILATOR

(75) Inventor: Julio Gabriel Shtanko, Dix Hills, NY (US)

(73) Assignees: William J. Meneely, Jr., Merrick, NY (US); Paul A. D'Ascoli, Merrick, NY (US); Anthony Russo, Merrick, NY (US); Julio Shtanko, Merrick, NY (US)

(*) Notice: Subject to any disclaimer, the term of this patent is extended or adjusted under 35 U.S.C. 154(b) by 0 days.

(21) Appl. No.: 10/355,870

(22) Filed: Jan. 30, 2003

(65) Prior Publication Data

US 2003/0157878 A1 Aug. 21, 2003

Related U.S. Application Data

(60) Provisional application No. 60/357,979, filed on Feb. 20, 2002.

(51) Int. Cl.[7] ................................. B60J 1/20
(52) U.S. Cl. ........................ 454/131; 454/162
(58) Field of Search ........................ 454/128, 131, 454/162, 163

(56) References Cited

U.S. PATENT DOCUMENTS

| | | | | |
|---|---|---|---|---|
| 4,899,645 A | * | 2/1990 | Wolfe et al. | 454/131 |
| 4,986,169 A | * | 1/1991 | Chen | 454/131 |
| 5,044,258 A | * | 9/1991 | Wu et al. | 454/131 |
| D324,418 S | | 3/1992 | Shtanko | D23/324 |
| 5,094,151 A | * | 3/1992 | Bernard | 454/131 |
| 5,099,752 A | * | 3/1992 | Bosley | 454/131 |
| 5,120,271 A | | 6/1992 | Shtanko | 454/137 |
| 5,683,293 A | | 11/1997 | Mohammed | 454/132 |
| 6,030,285 A | * | 2/2000 | Chen | 454/75 |
| 6,053,809 A | | 4/2000 | Arceneaux | 454/228 |
| 6,072,398 A | * | 6/2000 | Hayes et al. | 340/632 |

OTHER PUBLICATIONS

American Sensores, Inc. smokesign.com, 2 page website, 2002 Kiddie Corp., safe and sound, safe.com, 1 page website 2002 First Alert Combination Smoke and Carbon Monoxide Alarm, Model No. SC01N, Live Easy Products, fivendime-.com, 2 page website 2002.

* cited by examiner

Primary Examiner—Derek Boles
(74) Attorney, Agent, or Firm—Alfred M. Walker

(57) ABSTRACT

A portable after market vehicle cabin ventilator provides a portable exhaust for a vehicle cabin, which utilizes the vehicle window for mounting and which promotes the quality of air within the vehicle cabin, without the need to open the windows in inclement cold or hot weather. The ventilator also optionally detects dangerous carbon monoxide fumes within a parked or moving vehicle. The ventilator of the present invention enhances the air quality of the vehicle interior by incorporating smoke and gas detectors, as well as one or more fans.

8 Claims, 4 Drawing Sheets

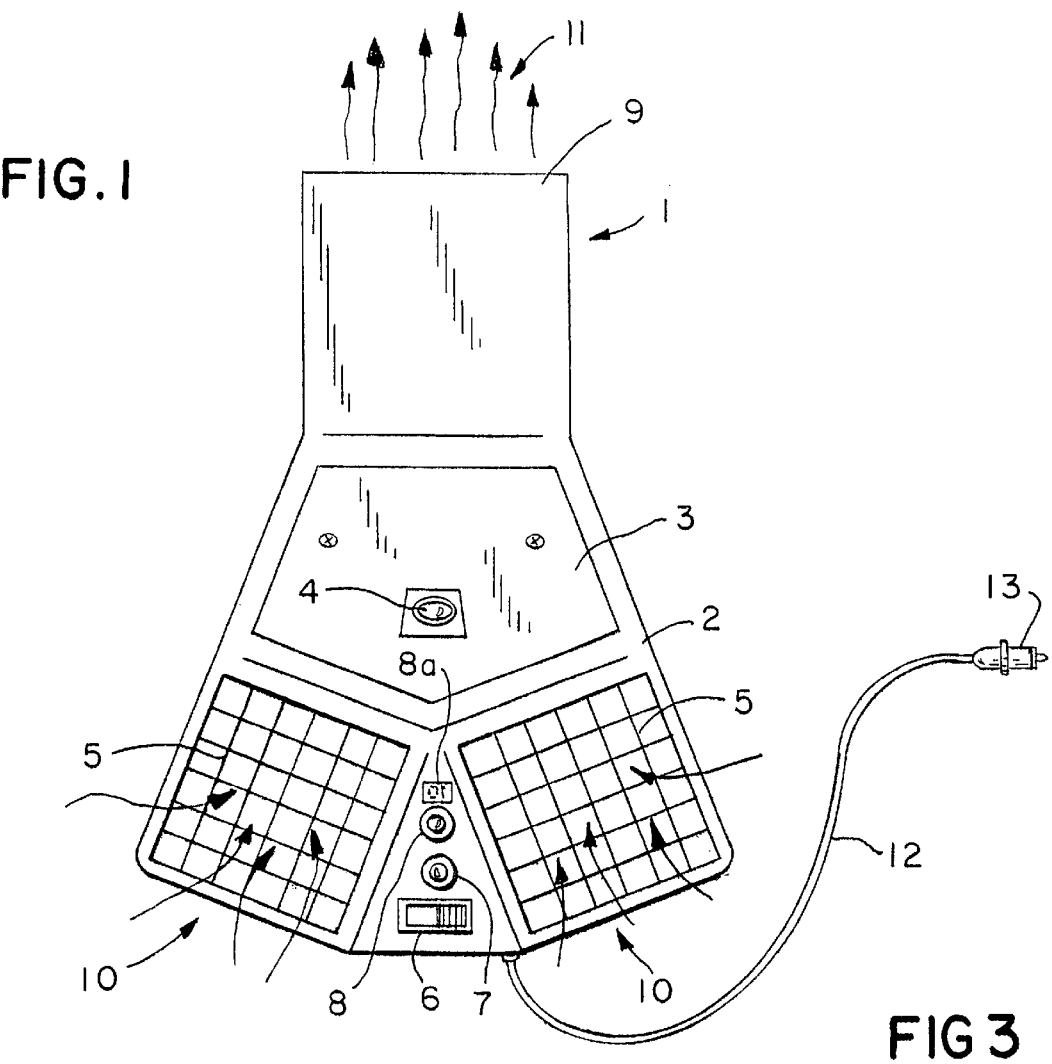
FIG. 1
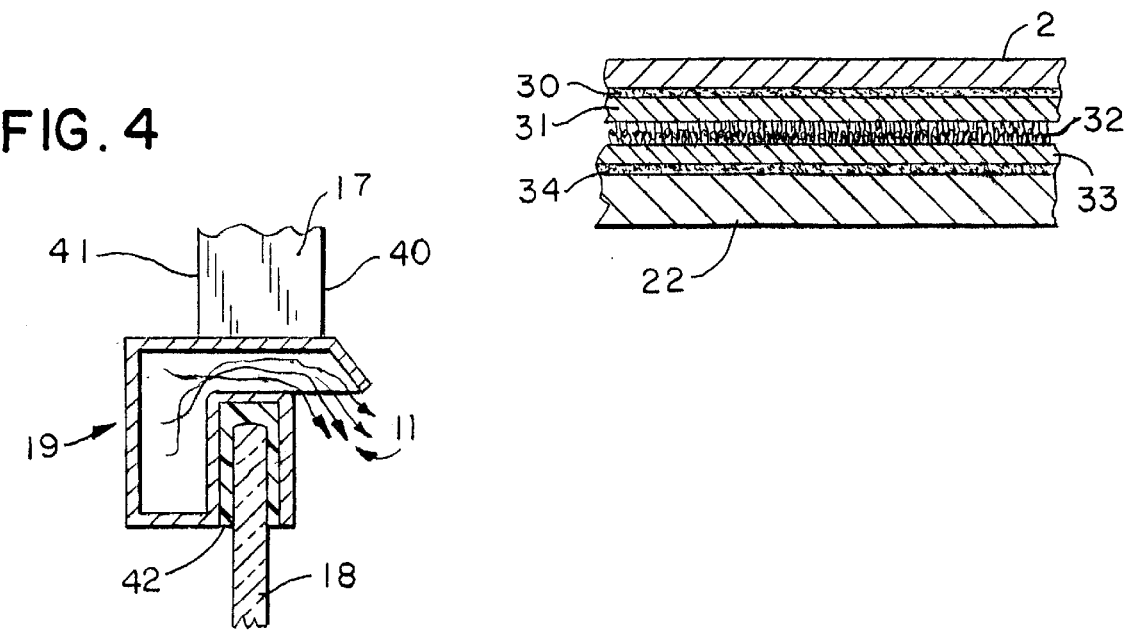
FIG. 4
FIG 3

AFTERMARKET VEHICLE CABIN VENTILATOR

This claims the benefit of provisional application No. 60/357,979, filed on Feb. 20, 2002.

FIELD OF THE INVENTION

The present invention relates to exhaust and smoke ventilators for motor vehicles

BACKGROUND OF THE INVENTION

Often when driving a person smoking a cigarette has to evacuate the smoke by opening the vehicle windows. However, that is uncomfortably cold in the winter, uncomfortably hot in the summer, and brings in wet rain during a rainstorm.

Among related patents include US Patent No. U.S. Pat. No. 5,120,271 of the Applicant Julio Shtanko for a ventilator for exhausting cigarette smoke and carbon monoxide gas from a ventilator interior.

However, the installation of the ventilator requires putting a hole in a car roof or frame in order to exhaust the smoke or gas.

Among prior art patents describing the use of a smoke detector and exhaust fan include U.S. Pat. No. 6,053,809 of Arceneaux for a building ceiling.

Moreover, U.S. Pat. No. 5,683,293 of Mohammed discloses a very thin hook-over-window draped exhaust consisting of passive louvers but it has no fan. It exhausts smoke purely by opening and directing the air flow, not with a fan as in Shtanko '271, which discloses an exhaust fan, a carbon monoxide detector and tubes for evacuating air from the interior. However, Shtanko 271' does not describe a portable vehicle cabin ventilator. Neither Shtanko '271, Arceneaux, 809 nor Mohammed '293 describe a portable vehicle cabin ventilator which utilizes a snug, over the window exhaust which, powered by the vehicle's battery, such as through the cigarette lighter, greatly enhances the purity of the air within the vehicle's cabin, by exhausting cigarette smoke, or noxious fumes from the vehicles.

OBJECTS OF THE INVENTION

It is therefore an object of the present invention to provide a portable after market vehicle cabin ventilator.

It is also an object of the present invention to provide a portable exhaust for a vehicle cabin which utilizes the vehicle window for mounting and which promotes the quality of air within the vehicle cabin, without the need to open the windows in inclement cold or hot weather.

Other objects which become apparent from the following description of the present invention.

SUMMARY OF THE INVENTION

In keeping with these objects and others which may become apparent, the present invention is a ventilator for a vehicle cabin which detects and exhausts air contaminated by cigarette, pipe or cigar smoke through an exhaust mounted on the vehicle window.

The ventilator also detects dangerous carbon monoxide fumes within a parked or moving vehicle. The ventilator of the present invention enhances the air quality of the vehicle interior by incorporating smoke and gas detectors, as well as one or more fans. The addition of the window mount to the ventilator greatly enhances the portability aspects while maintaining its utility as a exhaust ventilator.

The use of low voltage direct current power, such as from the cigarette lighter, provides the ventilator with a convenient and reliable source of power.

The important monitoring function of the ventilator is maintained with the smoke and gas detector features. The combination of the exhaust system with the unique window mount provide beneficial effects that are not possible with any other type of portable exhaust.

In a preferred embodiment, the structure of the ventilator is thin and covered with a soft interior, such as a thermoplastic elastomer, so as not to be obstructive within the vehicle interior.

In one of the embodiments, the portable ventilator is used in a vehicle cabin, over the window, which slides up to close the window opening. The portable ventilator includes a housing containing an exhaust fan. The housing is adapted to be removably mounted at any suitable location within the vehicle cabin.

Electrical power is provided to the exhaust fan from a source of power, such as one or more batteries or the cigarette lighter, within the cabin. The housing has ventilator module which is mounted on a top edge of a partially open window in the vehicle cabin. The ventilator module includes an elongated housing with an inverted U-shaped section straddling the top edge of the window. An extended exhaust plenum is formed within the module on the interior side of the window adjacent to the U-shaped section, and an overhanging section of the module butts against a top of the window opening. The overhanging section forms a passageway that communicates with the exhaust plenum and it has an elongated discharge opening outside of the vehicle cabin.

A hose connects the exhaust fan in the housing to one end of the exhaust plenum in the ventilator module to exhaust stale or smoke-filled air within the cabin out through the discharge opening of the module, to the outside of the vehicle cabin.

Preferably, the portable ventilator has a carbon monoxide sensor that automatically initiates operation of the exhaust fan when a predetermined threshold of carbon monoxide is reached. In addition, the portable ventilator may have a manual on/off switch for turning the exhaust fan on and off. To prevent hot or cold ambient outside air from entering the cabin while the portable ventilator housing straddles the window, the U-shaped section of the ventilator module has a seal between its walls and window.

Additionally, the portable ventilator has further extended seals between edges of the window and the window opening where the window edge is not covered by the ventilator module.

In a preferred embodiment, wherein the portable ventilator is used in a vehicle cabin, over a window, which slides up to close window opening, the ventilator module is mounted on a top edge of a partially open window in the vehicle cabin. This ventilator module also has an elongated housing with an inverted U-shaped section straddling the top edge of the window, an extended plenum formed within the module on the interior side of the window adjacent to the U-shaped section, and an overhanging section of the module which butts against a top of the window opening. The overhanging section forms a passageway communicating with the plenum and has an elongated discharge opening outside of the vehicle cabin.

This portable ventilator also includes an inlet to the plenum from the interior of the vehicle cabin, and one or more cross flow exhaust fans mounted within the plenum to draw air from the cabin, through the inlet and out of the discharge opening outside of the vehicle cabin. Preferably, the portable ventilator has one or more batteries to provide electrical power to the exhaust fan, and a switch that activates the exhaust fan.

Alternatively it can be powered by the vehicle cigarette lighter.

The portable ventilator can have a row of cross flow exhaust fans. In addition, the inlet of the portable ventilator may be provided at a diagonal angle, with a face of the window and the exhaust fans being slanted downwardly toward the inlet.

BRIEF DESCRIPTION OF THE DRAWINGS

The present invention can best be understood in connection with the accompanying drawings. It is noted that the invention is not limited to the precise embodiments shown in drawings, in which:

FIG. 1 is a top plan view of a portable exhaust ventilator unit of this invention;

FIG. 3 is a crossectional detail of an attachment method for the ventilator of this invention;

FIG. 4 is a crossectional view of a window mounted air exhaust plenum of this invention;

DETAILED DESCRIPTION OF THE INVENTION

Figure 2:
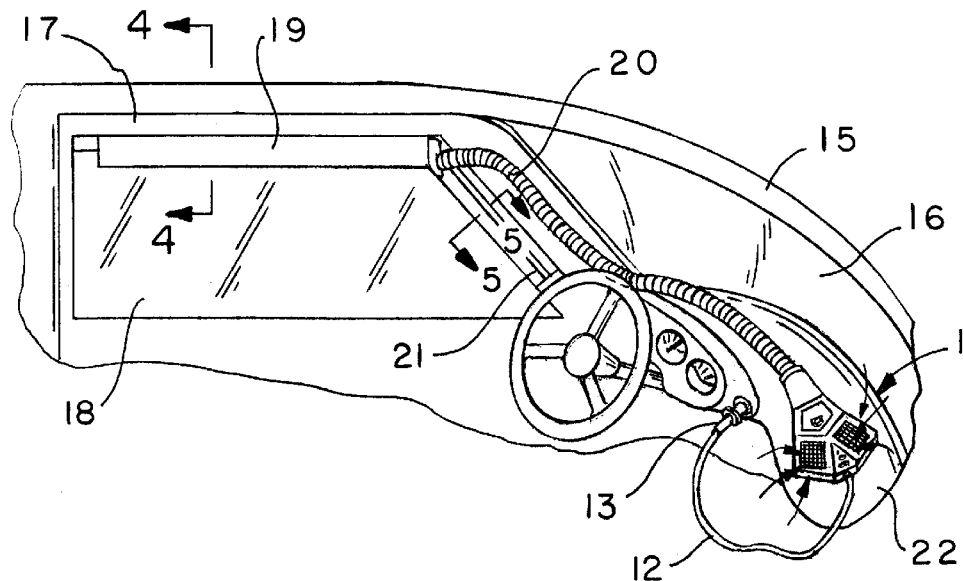
FIG. 2 is a perspective view of a vehicle interior section with the ventilator of this invention installed.

Although powered vehicle ventilators for exhausting cigarette, pipe, or cigar smoke from the interior are known, they typically require some vehicle modification for installation. The present invention describes a ventilator system, which exhausts contaminated air through the vehicle window and is attached and powered in an easily removable manner without vehicle modifications.

FIG. 1 shows a top view of a ventilator module 1 of the embodiment of this invention. Housing 2 is angled as shown and has sloping surfaces which accommodate two exhaust fans behind inlet screens 5. The exhaust fans may be typically DC brushless types available from a number of manufacturers and used typically for cooling of electronics. One such type is a Panasonic FBA08A12U1A measuring 80 mm square which is available from Digi-Key Corp. of Thief River Falls, Minn. In this embodiment of FIG. 1, air enters at inlet 10 and is exhausted at outlet plenum 9 as designated by 11.

Also optionally included in this embodiment of FIG. 1 is a carbon monoxide detector behind panel 3 with exposed detector head 4. This can be, for example, a Figaro TGS 800 unit. This carbon monoxide detector is operative through a power source, such as the cigarette lighter while the vehicle is on, detecting carbon monoxide fumes and exhausting then from the interior of the vehicle cabins interior. Also shown are line cord 12 and cigarette lighter plug 13, which are used to tap into the vehicle 12-volt DC supply. The carbon monoxide detector can automatically turn on the ventilator fans if a certain concentration threshold is exceeded; lighting red indicator 8 indicates this mode. Optionally, the carbon monoxide detector may have a digital display 8a showing a numerical level of carbon monoxide concentration in the vehicle cabin's interior. This digital indicator 8a is useful as a precautionary warning, so that no false sense of security occurs when the fan or fans turn on and the user thinks that the fan or fans are activated only by cigarette smoke. Manual switch 6 can also turn on the ventilators regardless of the level of contamination. Green indicator 7 shines when the fans are on.

Combined carbon monoxide and smoke detectors really can be used, such as manufactured under the trade name "First Alert" or by American Sensors, Inc.

FIG. 2 shows the driver corner of the vehicle interior with vehicle roof 15, driver's door 17, windshield 16, driver's window 18 and dashboard 22 one embodiment for Ventilator module 1 is removably attached to dashboard 22 using strips of self-lock mushroom head fasteners, such as supplied by McMaster-Carr Supply Company of Brunswick, N.J.

FIG. 3 is a crossectional side detail of this attachment method. The fastener strips mentioned are more rigid than the more common hook and loop type and have high holding power. These strips have an integral adhesive layer, which is exposed by removing release strips. The mushroom heads mate with each other so that only one type of strip is required. The bottom fastener strip with adhesive layer 34 and substrate 33 is attached to dashboard 22. The mated mushroom heads from both strips are shown as layer 32. The substrate and adhesive layer of the top fastener strip are layers 31 and 30 respectively. Adhesive 30 is attached to housing bottom 2 of ventilator module 1. The embodiment shown in FIGS. 2 and 3 shows flexible corrugated hose 20 which connects module 1 to exhaust plenum 19, which is attached to the top edge of window 18. Fastener strips can also be used to route hose 20 across dashboard 22 and along the edge of windshield 16.

While the installation shown in FIGS. 2 and 3 exhausts through the driver's window, it must be realized that any vehicle window can be used. If a rear window is used, ventilator module 1 can be attached to the back of a front seat or to the back door. If only a single occupant is smoking, it is more effective to locate ventilator 1 close to the smoker to minimize the mixing of smoke with cabin air in general.

The housing 2 of ventilator 1 as well as plenum 19 should be made of non shattering material that will deform to absorb impact during an accident. A variety of semi-rigid thermoplastic elastomers (TPE's) as well as TPE covered sheet metal can be utilized. Optional window mounted, longitudinally extending elastomeric seal 21 to minimize infiltration of outside air and wind noise is also shown in place.

FIG. 4 is a crossection detail of a window mounted exhaust plenum showing the manner in which plenum 19 is held in place by window pane 18 and placement against door frame 17 on top. Elastomeric U-gasket 42 grips window glass 18 within the more rigid plenum 19 U-section to which it is bonded. Contaminated air 11 is exhausted to the outside 40 from interior 41. The dimensions of plenum 19 minimize the area and locate the obscuration to an non-obtrusive position along the window top edge.

Figure 5:
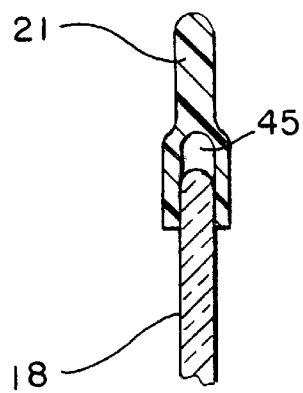
FIG. 5 is a crossectional view of a window seal accessory of this invention.

FIG. 5 is a crossection detail of window-mounted elastomeric seal 21, which can be used along the leading edge of slightly open window 18. Deep slot 45 permits adjustment. The distal end of the profile of elastomeric seal 21 fits in the front window channel (not shown).

Figure 6:
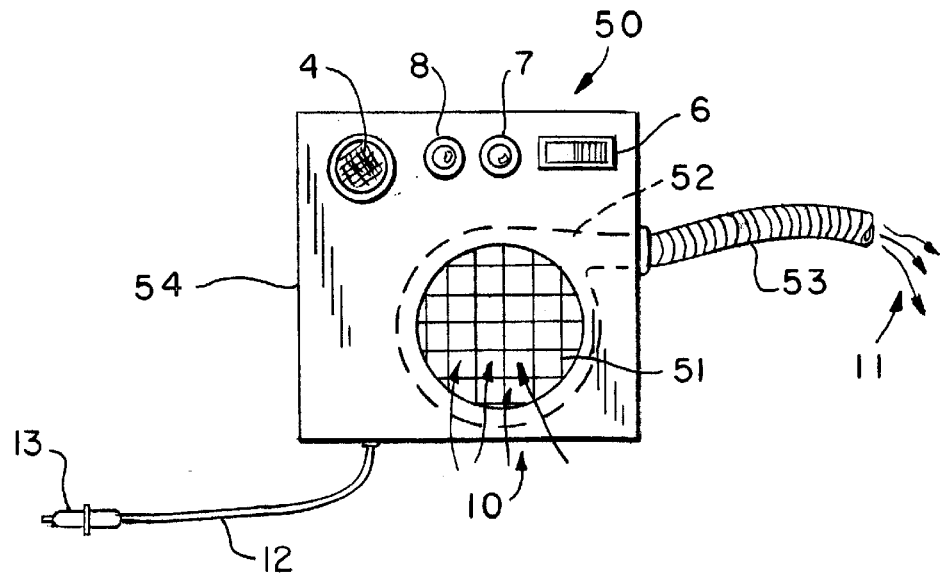
FIG. 6 is a top plan view of an alternate embodiment using a scroll type blower.

FIG. 6 is a top view of an alternate embodiment of this invention showing ventilator module 50 with rectangular housing 54 and intake grill 51. Switch 6, indicators 7 and 8, and carbon monoxide detector head 4 serve the same functions as in ventilator module 1. The main difference in this embodiment is the use of a single scroll type blower 52 (shown in phantom lines) instead of the dual fans. Blower 52 can be a Panasonic part number FAL6F12LL which has higher pressure capability than the fans of ventilator module 1; this makes it possible to use smaller diameter hose 53 to exhaust stale air 11.

Figure 7:
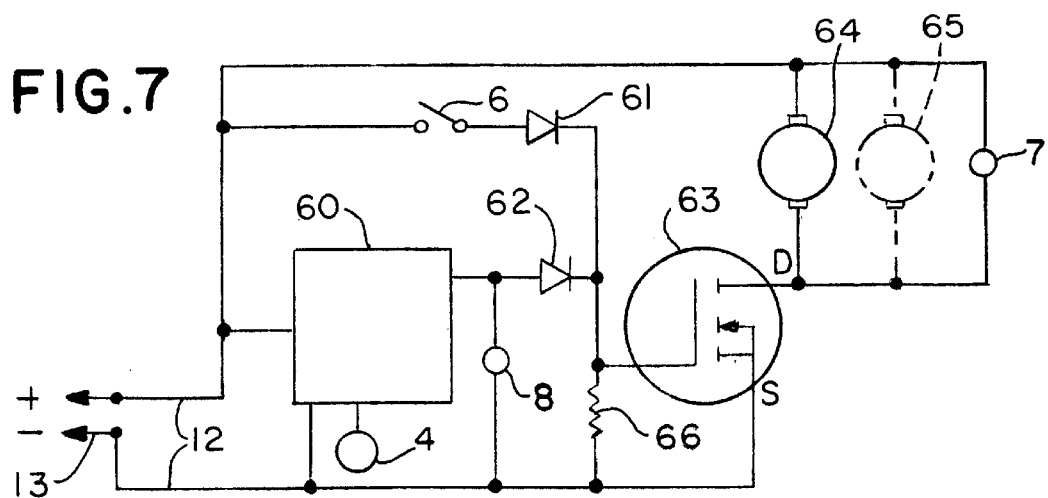
FIG. 7 is a schematic diagram of a ventilator circuit.

FIG. 7 is a schematic diagram showing carbon monoxide circuit board 60 with head 4 and indicator 8. Diodes 61 and 62 permit isolation between the outputs of board 60 and manual switch 6 while independently controlling the operation of fan or blower 64 (and second fan 65) through MOSFET transistor 63 (metal oxide field effect transistor). Resistor 66 is a pull down resistor of preferably 10 k ohms.

Figure 8:
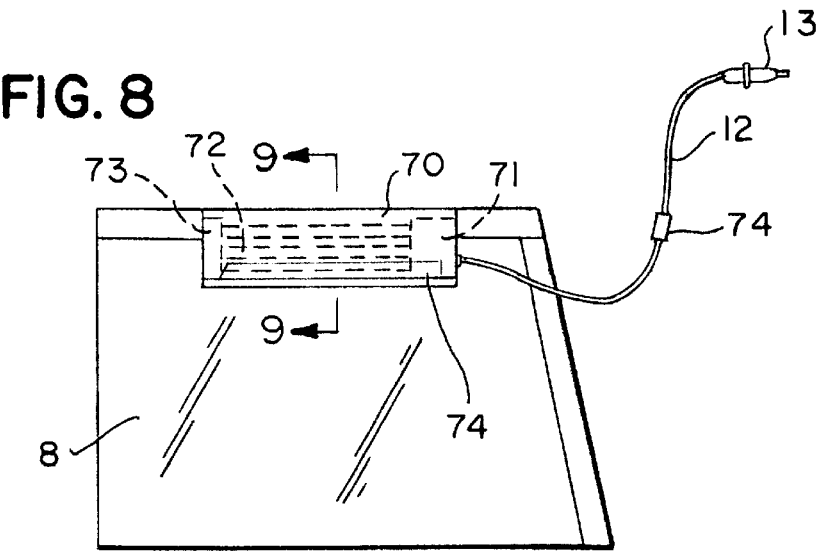
FIG. 8 is a side elevational view of a window mounted ventilator embodiment.

FIG. 8 is a side view of yet another ventilator embodiment. This compact module 70 is mounted directly to window 18. It is controlled by line mounted switch 74 and no carbon monoxide detector is included. The key advantage to this design is compactness and shape conformability, which permits direct window attachment. The compactness and narrow long shape are made possible by the use of a cross flow fan which is shown in phantom lines as motor 71, elongated blower wheel 72 and end bearing 73. A Panasonic model FCB34AF12 available from Digi-Key can be used.

Figure 9:
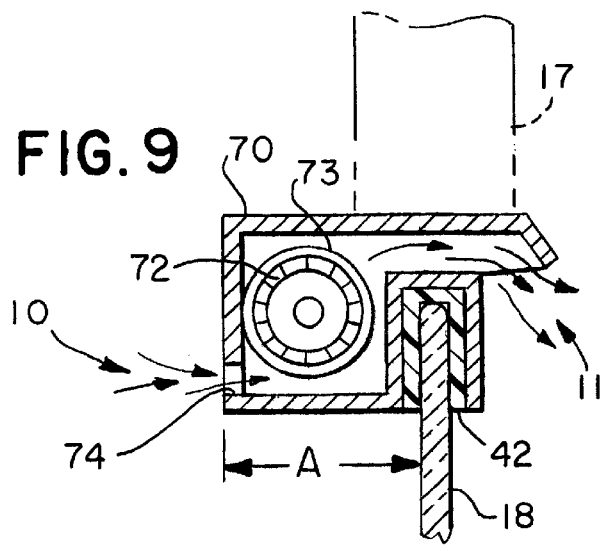
FIG. 9 is a crossectional view of a window-mounted embodiment.

FIG. 9 is a crossectional view showing that the entire ventilator 70 can be housed in a unit just slightly deeper than plenum 19; it is mounted in the same manner as plenum 19 was mounted. Inlet slot 74 receives the stale air 10 and exits it outside at 11. Since dimension A is limited, only a small moment load on window glass 18 (partly taken by doorframe 17) is imposed. No corrugated hose is required for this embodiment.

Figure 10:
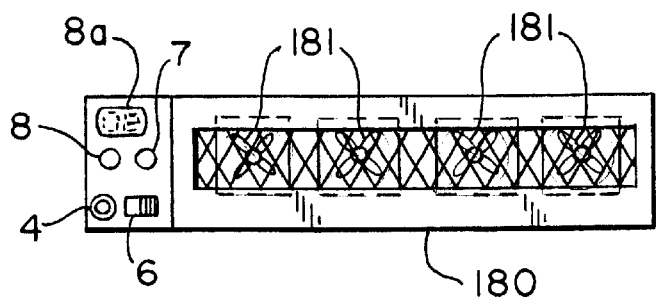
FIG. 10 is a front view in cross-section for a preferred embodiment for a window mounted ventilator.
Figure 11:
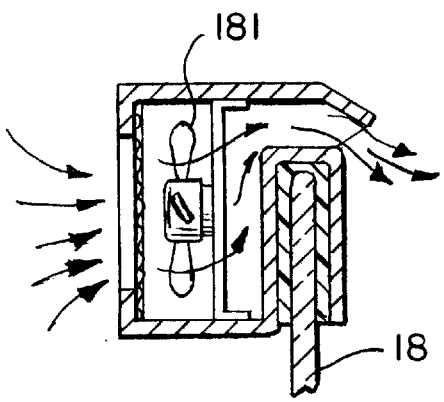
FIG. 11 is a side elevational view in cross-section thereof.

FIG. 10 is a front view in cross-section for a preferred embodiment for a window mounted ventilator similar to FIG. 9, but where one or more thin tube axial exhaust fans 181 are provided in a module 180 such as manufactured by Agusta cooling services for cooling computers. These thin tube axial exhaust fans 181 are thin with a depth of only one inch. They can be laid side to side, as shown in FIG. 10, with a module of only about an inch and a half in depth, as shown in FIG. 11, where module 180 is shown draped over window 18.

Figure 12:
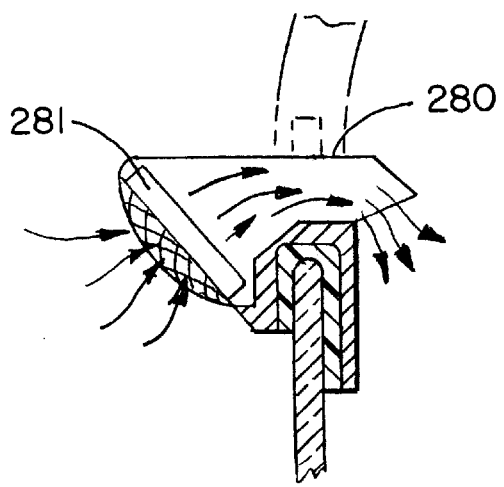
FIG. 12 is a side elevational view in crossection for another preferred embodiment for a slanted window mounted ventilator.

FIG. 12 in another preferred embodiment for a window mounted ventilator 280, fans 281 are slanted downward, to maximize exhaust flow therein.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. A portable ventilator for use in a vehicle cabin having a window which slides up in a window opening to close, comprising:
    a housing containing an exhaust fan adapted for being removably mounted at any suitable location within said cabin;
    means for providing electrical power to said exhaust fan from a source of power within said vehicle cabin;
    a ventilator module adapted to be mounted on a top edge of a partially open window in said vehicle cabin;
    said ventilator module comprising an elongated housing with an inverted U-shaped section straddling the top edge of said window, an extended plenum formed within said module on the interior side of said window adjacent said U-shaped section, and an overhanging section of said module butting against a top of said window opening, said overhanging section forming a passageway communicating with said plenum and having an elongated discharge opening outside of said vehicle cabin;
    a hose connecting said exhaust fan in said housing to one end of the plenum in said ventilator module for exhausting air within said cabin out through the discharge opening of said module to the outside of said vehicle cabin.

2. The portable ventilator of claim 1 in which said exhaust fan housing has a carbon monoxide sensor for automatically initiating operation of said exhaust fan when a predetermined threshold of carbon monoxide is reached.

3. The portable ventilator of claim 2 having a manual on/off switch for turning said exhaust fan on and off.

4. The portable ventilator of claim 1 in which said U-shaped section of said ventilator module has a seal between walls of said section and said window.

5. The portable ventilator of claim 4 having extended seals between edges of said window and the window opening where said window edge is not covered by said ventilator module.

6. A portable ventilator for use in a vehicle cabin having a window which slides up in a window opening to close, comprising:
    a ventilator module adapted to be mounted on a top edge of a partially open window in said vehicle cabin;
    said ventilator module comprising an elongated housing with an inverted U-shaped section straddling the top edge of said window, an extended plenum formed within said module on the interior side of said window adjacent said U-shaped section, and an overhanging section of said module butting against a top of said window opening, said overhanging section forming a passageway communicating with said plenum and having an elongated discharge opening outside of said vehicle cabin;
    an inlet to said plenum from the interior of said vehicle cabin;
    a cross flow exhaust fan mounted within said plenum drawing air from said cabin through said inlet and out said discharge opening outside of said vehicle cabin;
    means for providing electrical power to said exhaust fan; and
    a switch for activating said exhaust fan.

7. The portable ventilator of claim 6 in which said plenum contains a row of cross flow exhaust fans.

8. The portable ventilator of claim 7 in which the inlet is at a diagonal angle with a face of said window and said exhaust fans are slanted downwardly toward said inlet.

* * * * *